US008451735B2

(12) United States Patent
Li (10) Patent No.: US 8,451,735 B2
(45) Date of Patent: May 28, 2013

(54) SYSTEMS AND METHODS FOR DYNAMIC LOAD BALANCING IN A WIRELESS NETWORK

(75) Inventor: Aihua Edward Li, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 475 days.

(21) Appl. No.: 12/567,928

(22) Filed: Sep. 28, 2009

(65) Prior Publication Data

US 2011/0075556 A1    Mar. 31, 2011

(51) Int. Cl.
*H04L 12/26* (2006.01)
*H04L 12/56* (2006.01)

(52) U.S. Cl.
CPC .................... *H04L 47/125* (2013.01)
USPC .......................... 370/236; 455/453

(58) Field of Classification Search
USPC ............... 370/229, 230, 235, 236, 237, 238, 370/310, 328, 431, 465; 455/450, 453, 455
See application file for complete search history.

(56) References Cited

U.S. PATENT DOCUMENTS

| | | | |
|---|---|---|---|
| 7,222,175 B2 * | 5/2007 | Knauerhase et al. | 709/225 |
| 7,454,213 B2 * | 11/2008 | Tolli | 455/453 |
| 7,480,264 B1 * | 1/2009 | Duo et al. | 370/310.2 |
| 7,494,062 B2 | 2/2009 | Holz et al. | |
| 7,813,717 B2 | 10/2010 | Huotari et al. | |
| 7,881,208 B1 | 2/2011 | Nosella et al. | |
| 2001/0055283 A1 | 12/2001 | Beach | |
| 2004/0053624 A1 * | 3/2004 | Frank et al. | 455/453 |
| 2004/0199668 A1 | 10/2004 | Lin et al. | |
| 2005/0157676 A1 | 7/2005 | Kwak et al. | |
| 2005/0169183 A1 * | 8/2005 | Lakkakorpi et al. | 370/238 |
| 2005/0260996 A1 * | 11/2005 | Groenendaal | 455/445 |
| 2005/0265283 A1 * | 12/2005 | Qi et al. | 370/331 |
| 2006/0045272 A1 | 3/2006 | Ohaka | |
| 2006/0154609 A1 * | 7/2006 | Takano | 455/67.13 |
| 2006/0239207 A1 | 10/2006 | Naghian | |
| 2007/0060105 A1 | 3/2007 | Batta | |
| 2007/0076671 A1 | 4/2007 | Winget et al. | |
| 2007/0204046 A1 | 8/2007 | Batta et al. | |
| 2008/0049687 A1 | 2/2008 | Shankar et al. | |

(Continued)

FOREIGN PATENT DOCUMENTS

| | | |
|---|---|---|
| EP | 1401150 A2 | 3/2004 |
| WO | 2005055524 A1 | 6/2005 |
| WO | 2009056164 A1 | 5/2009 |

OTHER PUBLICATIONS

International Search Report & Written Opinion for International Application No. PCT/US2010/047116 mailed on Nov. 10, 2010.
Non Final Office Action mailed Sep. 27, 2011, in U.S. Appl. No. 12/141,685, Aihua Edward Li., filed Jun. 18, 2008.

*Primary Examiner* — Michael Thier
*Assistant Examiner* — Curtis A Alia (57) ABSTRACT

The present disclosure relates to systems and methods for dynamic load balancing in a wireless network, such as a wireless local area network (WLAN) and the like. Specifically, the present invention periodically provides dynamic load balancing of mobile devices associated with a plurality of wireless access devices. This may include determining an optimum load and instructing wireless access devices that are overloaded to disassociate some mobile devices based upon predefined criteria. This disassociation is performed in a manner to minimize disruption by disassociating mobile devices with low usage, with close proximity to underutilized wireless access devices, and mobile devices not currently operating critical applications, such as voice.

9 Claims, 6 Drawing Sheets

U.S. PATENT DOCUMENTS

| | | | |
|---|---|---|---|
| 2008/0096575 A1* | 4/2008 | Aragon et al. | 455/453 |
| 2008/0170497 A1 | 7/2008 | Jeong et al. | |
| 2008/0280176 A1 | 11/2008 | Fukuda | |
| 2008/0316983 A1 | 12/2008 | Daigle | |
| 2009/0143046 A1* | 6/2009 | Smith | 455/404.1 |
| 2009/0177782 A1* | 7/2009 | Blatherwick et al. | 709/228 |
| 2009/0190500 A1 | 7/2009 | Ji et al. | |
| 2009/0285159 A1* | 11/2009 | Rezaiifar et al. | 370/328 |
| 2011/0164520 A1 | 7/2011 | Kostic et al. | |

* cited by examiner

SYSTEMS AND METHODS FOR DYNAMIC LOAD BALANCING IN A WIRELESS NETWORK

CROSS-REFERENCE TO RELATED APPLICATION(S)

This patent application is related to U.S. patent application Ser. No. 12/141,685 filed on Jun. 18, 2008, and entitled "METHOD AND APPARATUS FOR BALANCING LOAD ACROSS ACCESS DEVICES IN A WIRELESS NETWORK" The disclosure of the aforementioned patent application Ser. No. 12/141,685 is expressly incorporated herein by reference in its entirety.

FIELD OF THE INVENTION

The present invention relates generally to wireless networks. More particularly, the present invention relates to systems and methods for dynamic load balancing in a wireless network, such as a wireless local area network (WLAN) and the like.

BACKGROUND OF THE INVENTION

Conventionally, most wireless networks (such as wireless local area networks or WLANs), rely on infrastructure components that establish data communication links with mobile devices. A mobile device communicates, via a wireless data communication channel, with a wireless access device (such as an access point (AP) or access port device), which in turn communicates with other network components via traditional wired interfaces or via wireless backhaul interfaces. These wireless access devices generally communicate with the mobile devices using one or more radio frequency (RF) channels (e.g., in accordance with one or more of the IEEE 802.11 standards). The various 802.11 standards developed by the IEEE are available for download via URL: standards.ieee.org/getieee802/802.11.html; these various standards are hereby incorporated by this reference herein.

Often, it is desirable to balance the load created by the various mobile devices among the access devices in the wireless network. Specifically, the various mobile devices can be able to connect to more than one access device. Some existing techniques use proprietary protocols and/or predefined load criteria, and thus are limited in application to devices, systems, and/or networks compatible with these proprietary protocols or predefined load criteria. These proprietary methods are often inadequate or ineffective, as in most wireless networks, there will be numerous different brands or types of access devices and mobile devices from various manufacturers or vendors.

Additionally, some techniques utilize load advertising in beacons and probe responses, which provides load information from the access devices to a mobile device. The mobile device then determines which access device to connect to for purposes of load balancing, as opposed to the wireless network infrastructure. Thus, the ability of a system designer and/or network administrator to balance the load among access devices is largely dependent on the mobile devices in the wireless network. Furthermore, the administrator of the wireless network is limited in the ability to define or modify the criteria used to balance the load.

There are solutions to maintain mobile unit (MU) load balance across APs. However, these solutions are mostly static in that the load balance check is done at the time when the MU initially associates. These solutions do not attempt to maintain the load balance over time. Network operators often express a desire to maintain the load balance over time, not just at initial MU association. However, it is challenging to achieve dynamic load balancing without negative effects such as, for example, disassociation in the middle of a real-time transmission (e.g., voice, video, etc.).

BRIEF SUMMARY OF THE INVENTION

In various exemplary embodiments, the present invention relates to systems and methods for dynamic load balancing in a wireless network, such as a wireless local area network (WLAN) and the like. Specifically, the present invention periodically provides dynamic load balancing of mobile devices associated with a plurality of wireless access devices. This may include determining an optimum load and instructing wireless access devices that are overloaded to disassociate some mobile devices based upon predefined criteria. This disassociation is performed in a manner to minimize disruption by disassociating, mobile devices with low usage, with close proximity to underutilized wireless access devices, and mobile devices not currently operating critical applications, such as voice.

In an exemplary embodiment of the present invention, a method for dynamic load balancing across a plurality of access devices includes determining a respective load metric for each of a plurality of wireless access devices; distributing the respective load metric to each of the plurality of wireless access devices; and instructing one or more of the plurality of wireless access devices to disassociate one or more mobile devices. Determining the respective load metric includes determining a total mobile device count and a supposed mobile device count for each of the plurality of wireless access devices and an average mobile device count for the plurality of wireless access devices. The supposed mobile device count includes a balanced load responsive to the average mobile device count. The distributing the respective load metric includes sending a credit number to each of the plurality of wireless access devices. The instructing step includes disassociating a total number of mobile devices equal to a negative credit number. The method further includes at each of the one or more plurality of wireless access devices, compiling a candidate list of mobile devices, and disassociating the one or more mobile devices responsive to the candidate list. The candidate list includes an ordered list based upon one or more predetermined criteria. The one or more predetermined criteria includes any of bandwidth utilization, distance to neighboring wireless access devices with credit to accept mobile devices, and utilization of exempt applications that may be interrupted by disassociation. The utilization of exempt applications can include a voice call. The method further includes checking if one of the one or more mobile devices set for disassociation is operating an exempt application; if no exempt application is operating, disassociating the one of the one or more mobile devices; and if an exempt application is operating, setting up the one of the one or more mobile devices to be disassociated upon completion of the exempt application. The method further includes repeating the determining, distributing, and instructing steps at a configurable time interval.

In another exemplary embodiment of the present invention, a method for disassociating a plurality of devices for dynamic load balancing includes initializing a candidate list; assigning a candidate score to each of a plurality of devices; adding the assigned candidate score to the candidate list in an ordered structure; and disassociating one or more of the plurality of devices responsive to the assigned candidate score. The method further includes receiving a notification to disassociate a specific number of the plurality of devices to provide dynamic load balancing. The method further includes calculating the candidate score for each of the plurality of devices based upon traffic load of each of the plurality of devices, distance to a neighboring access device with credit to accept more devices, and application usage of each of the plurality of devices. The method further includes determining distances to neighboring access devices for each of the plurality of devices. The method also further includes monitoring a device to be disassociated for use of an application; and disassociating the device upon completion of a specific application.

In yet another exemplary embodiment of the present invention, a wireless device includes a communication module, the communication module being configured to communicate with a plurality of access devices on a network; a processor coupled to the communication module; and a database coupled to the processor, wherein the processor and the database are cooperatively configured to: determine a respective load metric for each of the plurality of access devices; distribute the respective load metric to each of the plurality of access devices; and instruct the one or more of the plurality of access devices to disassociate one or more mobile devices responsive to the respective load metric. The wireless device further includes a traffic monitor coupled to the communication module, the database, and the processor; wherein the traffic monitor is configured to monitor traffic on the one or more mobile devices set for disassociation and to determine if an application is in progress on one of the one or more mobile devices that would be disrupted by disassociation; and wherein the processor and the database are cooperatively further configured to disassociate the one of the one or mobile devices upon completion of the application. The processor and the database are cooperatively further configured to: gather distances between the plurality of access devices; and determine which of the one or more devices to disassociate responsive to proximity to neighboring access devices with load credit. The processor and the database are cooperatively further configured to periodically perform dynamic load balancing across the plurality of access devices.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
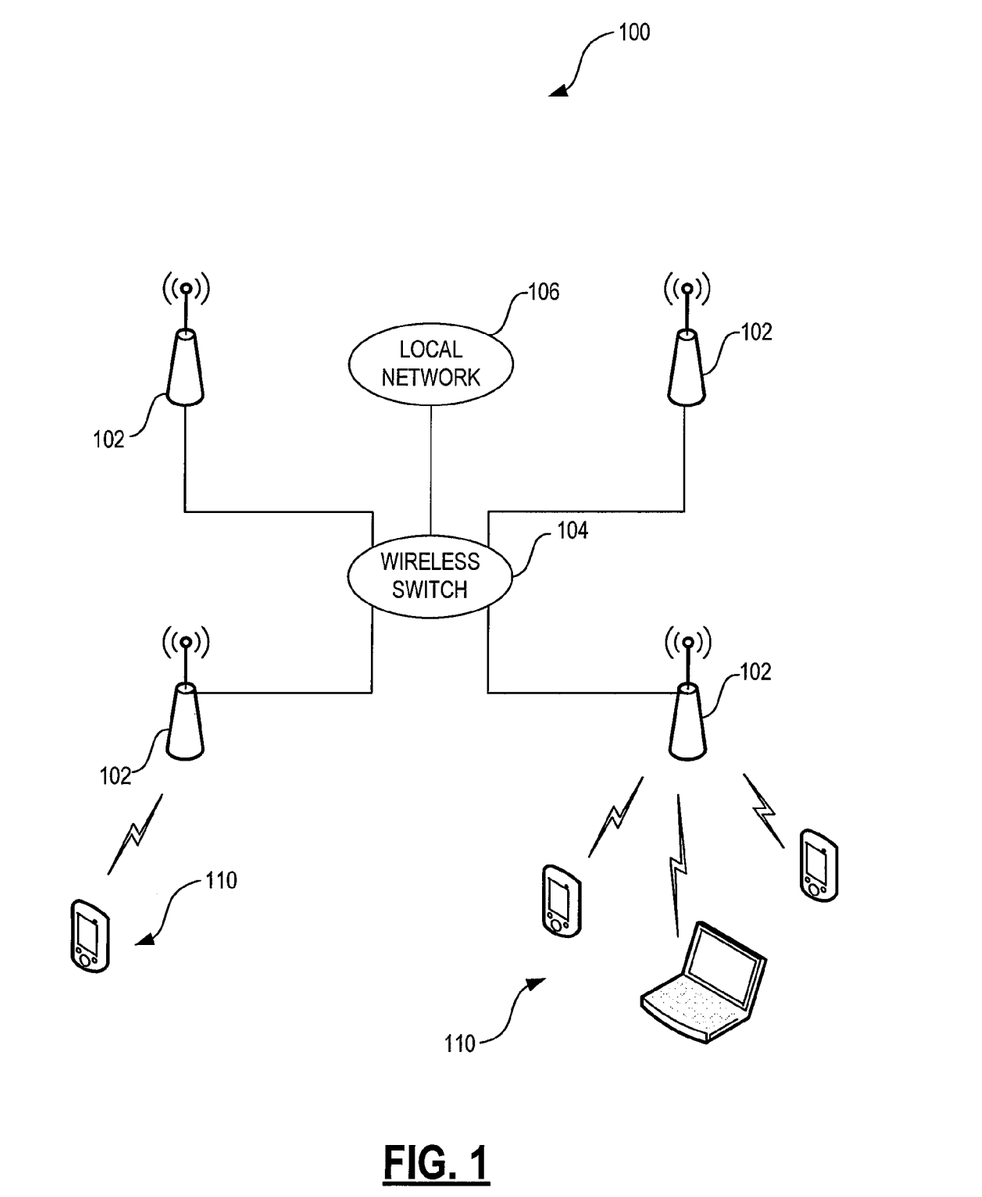
FIG. 1 is a wireless network including a plurality of wireless access devices and a wireless switch.

Referring to FIG. 1, in an exemplary embodiment, a wireless network 100 includes, without limitation, a plurality of wireless access devices 102 and a wireless switch 104. In an exemplary embodiment, the wireless network 100 is configured to support communications between and/or among mobile devices 110, and may include additional devices to support the functionality of the wireless network 100, such as Ethernet switches, and the like. In this embodiment, the wireless access devices 102 are access ports that cooperate with the wireless switch. In alternate embodiments, the wireless access devices 102 can be realized as access points (APs) that include embedded processing capabilities that take the place of that normally provided by a wireless switch. It should be appreciated that the wireless switch 104 may not be used in such alternate embodiments, and that the features and/or functionality described below in the context of the wireless switch 104 may be equivalently incorporated into the access devices 102 in such embodiments that do not include a wireless switch 104.

The wireless switch 104 may be coupled to a local network 106, which in turn may be coupled to one or more additional components and/or computer networks, as will be understood. It should be understood that FIG. 1 is a simplified representation of a wireless network 100 for purposes of explanation. A practical embodiment may have any number of wireless switches 104, each supporting any number of wireless access devices 102, and each wireless access device supporting any number of mobile devices 110. The topology and configuration of the wireless network 100 can vary to suit the needs of the particular application, and FIG. 1 is not intended to limit the application or scope of the subject matter in any way.

In an exemplary embodiment, the wireless network 100 is configured as a wireless local area network (WLAN). In alternative embodiments, the wireless network 100 may be configured as a wireless personal area network (WPAN), a wireless wide area network (WWAN), or any other suitable network configuration. The wireless network 100 may be configured to utilize a data communication protocol in accordance with IEEE 802.11, conventional Internet Protocol techniques, transmission control protocol/Internet protocol (TCP/IP), hypertext transfer protocol (HTTP), simple object access protocol (SOAP), or another comparable protocol.

In an exemplary embodiment, the wireless access devices 102 are coupled to the wireless switch 104. Depending on the embodiment, the wireless access devices 102 may be coupled to the wireless switch 104 via one or more additional access devices, wireless switches, Ethernet switches, routers, and/or various combinations thereof. In an exemplary embodiment, the wireless access devices 102 are configured to receive data from mobile devices 110 over wireless data communication links. Once that data is captured by the wireless access device 102, the data may be encapsulated (e.g., into a packet format compliant with a suitable data communication protocol) for communication to another access device 102, a mobile device 110, and/or the local network 106, as will be understood. In an exemplary embodiment, the wireless access devices 102 are realized as wireless access points, which rely on the network intelligence and management functions provided by the wireless switch 104, as described in greater detail below. It should be understood that in alternative embodiments, the wireless access devices 102 may include network intelligence and management functions incorporated therein.

A mobile device 110 may be realized using any suitable platform, including, without limitation: a cellular telephone; a personal digital assistant (PDA); a digital media player (e.g., mp3 player); a portable video game device; a laptop or other portable computer; or the like. In an exemplary embodiment, a mobile device 110 is configured to periodically scan for access devices 102, and maintain a list and/or table of the access devices 102 having a signal strength that indicates the mobile device 110 is within the communication range of the access device 102. For example, a mobile device 110 may receive broadcast messages and/or beacon signals from access devices 102 within communication range advertising their identity (e.g., service set identifier (SSID) or media access control (MAC) address). The mobile device 110 may then be configured to select an access device from the list of access devices within range, and send an association request to the selected access device. The mobile device 110 may automatically select the access device based on signal strength, in a random order, prompt a user for manually selecting an access device, or select an access device in some other manner. It should be appreciated that the functionality of the mobile device 110 will largely be dependent on the user, manufacturer, or vendor responsible for configuring and/or designing the mobile device, and the subject matter described herein is not limited to a specific manner of identifying an access device and making an association request.

In an exemplary embodiment, a mobile device 110 sends an association request, which may include information about the mobile device 110 (e.g., supported data rates) and the identity of the access device and/or network it wishes to associate with. In an exemplary embodiment, the access devices 102 are configured to route the association request to the wireless switch 104 for analyzing and responding to the association request, as described in greater detail below. In general, the wireless switch 104 sends an association response containing an acceptance or rejection notice to the mobile device 110 requesting association via an access device 102. If the association is granted, the wireless switch 104 may also provide information regarding the association, such as supported data rates or association identification, as will be understood.

Figure 2:
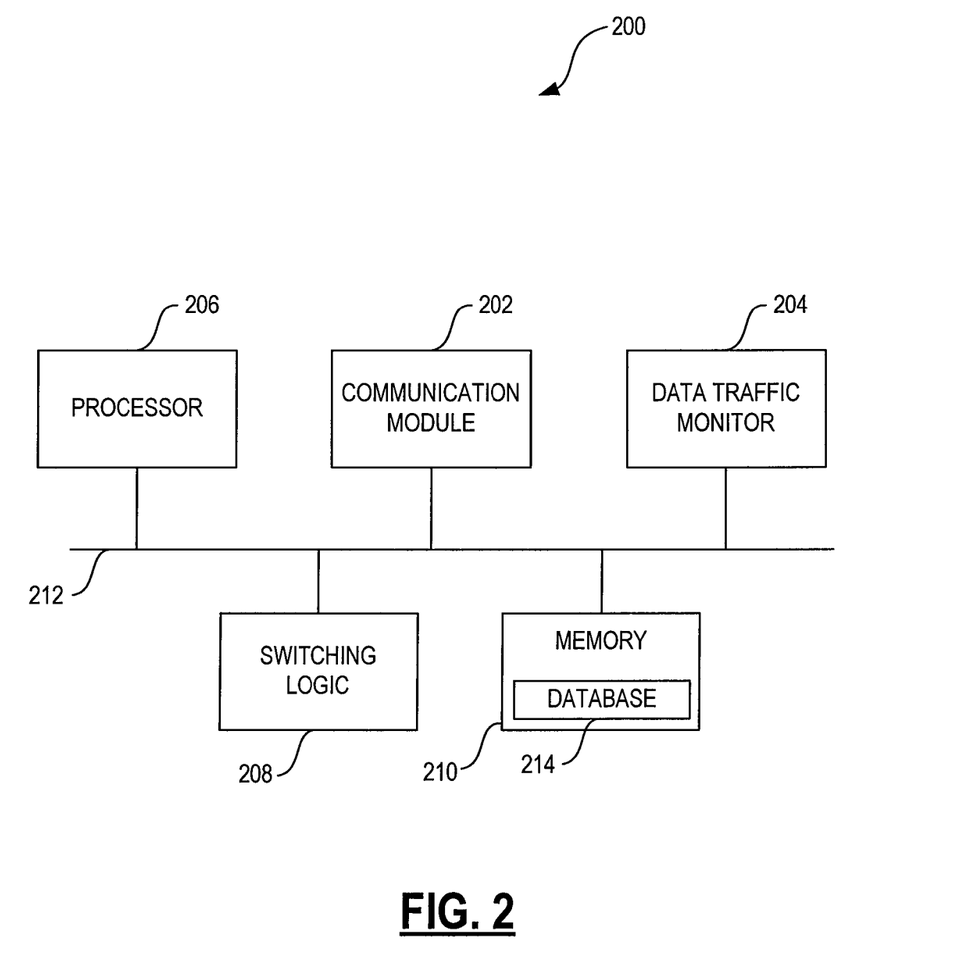
FIG. 2 is a schematic representation of an embodiment of a wireless switch suitable for use in a network, such as the wireless network shown in FIG. 1.

FIG. 2 is a schematic representation of an embodiment of a wireless switch 200 suitable for use in a network, such as wireless network 100 shown in FIG. 1. In an exemplary embodiment, a wireless switch 200 may include, without limitation: a communication module 202, a data traffic monitor 204, a processor 206, switching logic 208, and a suitable amount of memory 210. The elements of wireless switch 200 may be interconnected together using a bus 212 or another suitable interconnection arrangement that facilitates communication between the various elements of wireless switch 200. It should be appreciated that FIG. 2 depicts the wireless switch 200 in an oversimplified manner, and a practical embodiment may include additional components and suitably configured processing logic to support known or conventional operating features that are not described in detail herein.

In an exemplary embodiment, wireless switch 200 contains intelligence and processing logic that facilitates centralized control and management of WLAN elements, including wireless access devices (e.g., the wireless access devices 102 in FIG. 1) associated with wireless switch 200. In an exemplary embodiment, one wireless switch 200 can support any number of wireless access devices (limited only by practical considerations). Thus, wireless switch 200 can serve multiple wireless access devices, which in turn can serve multiple mobile devices. Wireless switch 200 is suitably configured to transmit and receive data, and it may serve as a point of interconnection between a WLAN and a fixed wire (e.g., Ethernet) network. In practice, the number of wireless switches 200 in a given network may vary depending on the number of network users and the physical size of the network.

In another exemplary embodiment, the wireless switch 200 can include one or more wireless access devices 102 in the same device, e.g. this is typical of an AP configuration.

In an exemplary embodiment, communication module 202 generally represents the hardware, software, firmware, processing logic, and/or other components of wireless switch 200 that enable bi-directional communication between wireless switch 200 and network components to which wireless switch 200 is coupled. For example, referring to FIG. 1, communication module 202 is suitably configured to communicate with components on the wireless network 100, such as the wireless access devices 102 and/or the local network 106. In accordance with one embodiment, communication module 202 provides an Ethernet interface such that wireless switch 200 can communicate with a conventional Ethernet-based computer network. In this regard, communication module 202 may include a physical interface for connection to the computer network, and communication module 202 (and/or processor 206) may handle Ethernet addressing for data packets sent from wireless switch 200. Note, in the AP configuration, the communication module 202 is not needed to communicate to the wireless access devices 102.

In an exemplary embodiment, the communication module 202 may support one or more wireless data communication protocols that are also supported by the wireless network infrastructure. Any number of suitable wireless data communication protocols, techniques, or methodologies may be supported by communication module 202, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the Wireless Medical Telemetry Service (WMTS) bands; General Packet Radio Service (GPRS); and proprietary wireless data communication protocols such as variants of Wireless USB. In an exemplary embodiment, communication module 202 is compliant with at least the IEEE 802.11 specification and configured to receive association requests via access devices coupled to the wireless switch 200, as described below. Communication module 202 may include or be realized as hardware, software, and/or firmware, as will be appreciated in the art.

In an exemplary embodiment, data traffic monitor 204 is configured to monitor the flow or amount of data processed by wireless switch 200. Data traffic monitor 204 may be implemented or performed with a processor 206, a content addressable memory, a digital signal processor (DSP), an application specific integrated circuit (ASIC), a field programmable gate array (FPGA), any suitable programmable logic device, discrete gate or transistor logic, discrete hardware components, or any combination thereof, designed to perform the functions described below. In an exemplary embodiment, data traffic monitor 204 can monitor the throughput, data rate, data volume, packet count, an average data rate, an average data volume, or any quantity or characteristic based upon empirical or statistical information. The monitored data may be unidirectional or bidirectional, depending upon the specific application. In an exemplary embodiment, the data traffic monitor 204 is configured to monitor data and/or network traffic for the individual access devices. For example, the data traffic monitor 204 may implement a table (or list, cache, database or another suitable data structure) that maintains associations of the monitored data and/or statistics with the respective access device transmitting/receiving the data for those access devices associated with the wireless switch 200. As described in more detail below, the information obtained by data traffic monitor 204 can be utilized to balance the load among wireless access devices in a wireless network. The data traffic monitor 204 may be further configured to detect certain types of voice calls and to provide/maintain information about whether there is an active voice call on a particular mobile device 110. The data traffic monitor 204 may maintain trigger events when voice calls start and end such that this information may be used for dynamic load balancing. Note, in addition to voice calls, the data traffic monitor 204 may be able to infer other real-time applications in use by mobile devices 110 through the monitored data and/or statistics.

In an exemplary embodiment, the processor 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor 206 includes processing logic that may be configured to carry out the functions, techniques, and processing tasks associated with the operation of the wireless switch 200, as described in greater detail below. Furthermore, the steps of a method or algorithm described in connection with the embodiments disclosed herein may be embodied directly in hardware, in firmware, in a software module executed by processor 206, or in any practical combination thereof.

In an exemplary embodiment, switching logic 208, which may be partially or completely realized in the processor 206, represents processing logic and functionality associated with the data switching and communicating features of wireless switch 200. Switching logic 208 may be configured to perform conventional operations that enable data traffic in the wireless network to be communicated between mobile devices, access devices, network infrastructure components, and network-based systems or applications. In an exemplary embodiment, switching logic 208 and processor 206 may be cooperatively configured to implement processing logic and functionality associated with the handling of association requests that originate at mobile devices 110, as described in greater detail below.

In an exemplary embodiment, memory 210 includes sufficient data storage capacity to support the operation of wireless switch 200. Memory 210 may be realized as RAM memory, flash memory, registers, a hard disk, a removable disk, or any other form of storage medium known in the art. In this regard, memory 210 may be coupled to processor 206 such that processor 206 can read information from, and write information to, memory 210. In the alternative, memory 210 may be integral to processor 206. In accordance with one embodiment, one or more software modules may reside in memory 210. In an exemplary embodiment, memory 210 is utilized to store information associated with various wireless access devices or mobile devices associated with the wireless switch 200 in a database 214, as described in greater detail below.

Figure 3:
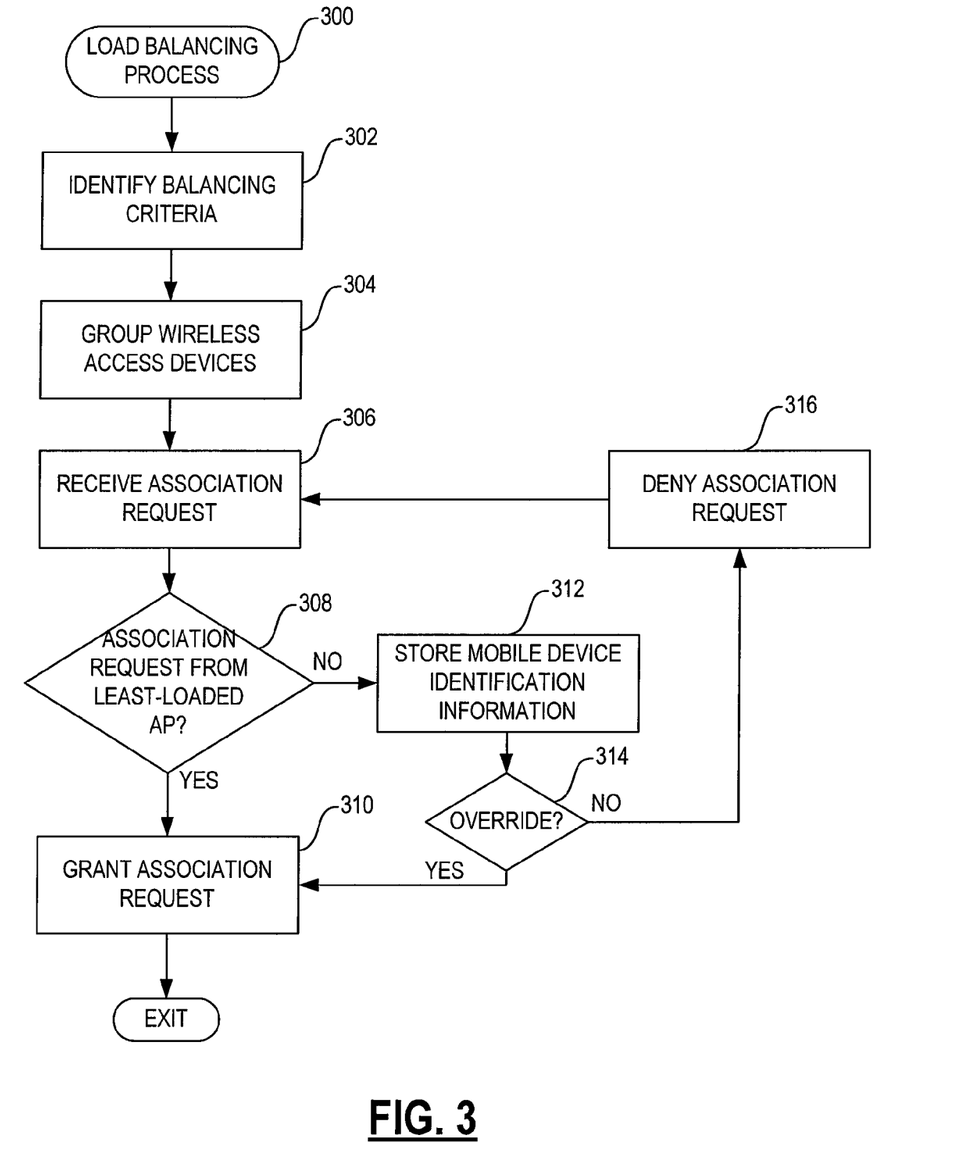
FIG. 3 is a flowchart of a load balancing process that may initialize when a wireless network begins operation.

Referring to FIG. 3, in an exemplary embodiment, a wireless network 100 may be configured to perform a load balancing process 300 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the wireless switch 104, 200, the processor 206, the wireless access devices 102, and/or the mobile devices 110. It should be appreciated any number of additional or alternative tasks may be included, and may be incorporated into a more comprehensive procedure or process having additional functionality not described in detail herein.

Referring now to FIG. 3, and with continued reference to FIG. 1 and FIG. 2, a load balancing process 300 may initialize when a wireless network begins operation, for example, upon initialization of the wireless network or upon resuming operation after regularly scheduled maintenance or downtime. In accordance with one embodiment, the load balancing process 300 initializes when a wireless switch is turned on or otherwise begins operation. In an exemplary embodiment, the load balancing process 300 is adapted to identify balancing criteria or a load metric for balancing the load in the wireless network (task 302). In accordance with one embodiment, the balancing criteria may be pre-coded in the wireless switch (e.g., in processor 206 and/or switching logic 208). In an exemplary embodiment, the balancing criteria may be determined subjectively and input manually by a network administrator or another user responsible for configuring and supervising operation of the wireless network. Accordingly, the balancing criteria may vary to suit the needs of a given wireless network. The load across access devices may be balanced based on a number of different balancing criteria or load metrics associated with each respective access device, such as, for example, the number of mobile devices associated with each access device, the data rate or throughput for each access device, the type of content being transmitted by and/or associated with each access device, or the packet count transmitted by and/or associated with each access device.

In an exemplary embodiment, the load balancing process 300 is configured to group the access devices on the wireless network into one or more groups (task 304). The access devices may be grouped based on one or more grouping criteria (e.g., location or proximity). In accordance with one embodiment, the access devices are grouped by manually configuring the wireless switch associated with the access devices. In an alternative embodiment, the wireless switch may be configured to automatically group the access devices. The wireless switch may be configured to group all the access devices associated with the wireless switch in a single group as part of the default settings for the wireless switch in the absence of any manual or automatic grouping. In an exemplary embodiment, the wireless switch may be configured to maintain the groups of access devices in a database, along with the data and/or load information associated with each of the access devices corresponding to the identified balancing criteria.

Figure 4:
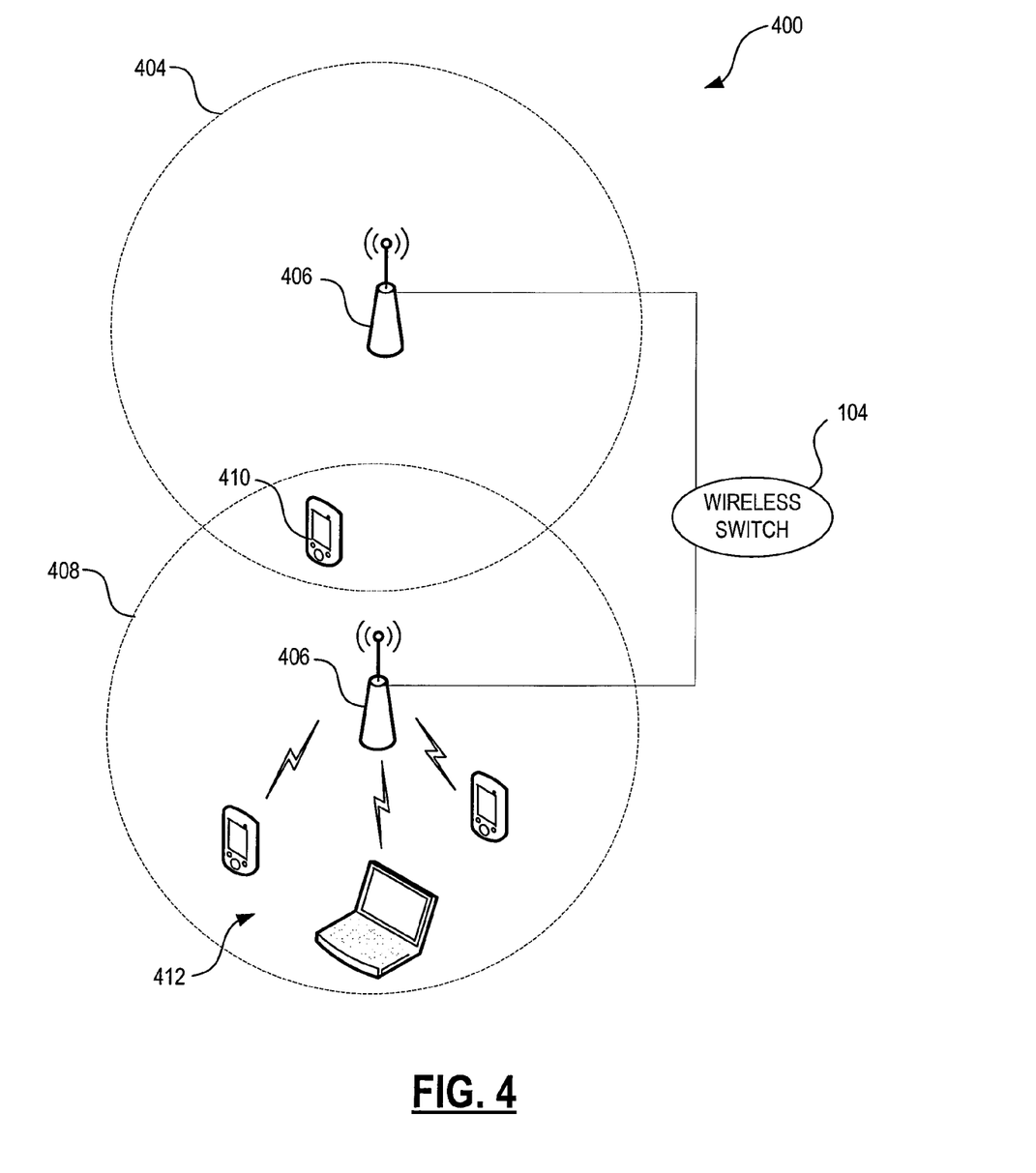
FIG. 4 is a wireless network including neighboring (e.g., adjacent) access devices.

Referring now to FIG. 3 and FIG. 4, in an exemplary embodiment, the access devices are ordered into groups based upon their proximity (or location relative) to one another. For example, a first access device 402 may have a broadcast or communication range 404 where the signal strength is sufficient for most mobile devices to communicate with the first access device 402 when within the range 404.

Similarly, a second access device 406 will also have an associated broadcast or communication range 408. In an exemplary embodiment, the access devices 402, 406 are grouped in a first group if there is enough overlap of their respective communication ranges 404, 408 such that an unassociated mobile device near one of the access devices 402, 406 would have a relatively equal likelihood of establishing a connection to the other access device 402, 406. In accordance with one embodiment, neighboring (e.g., adjacent) access devices in a wireless network 400 may be ordered in groups of two to simplify the task of determining how to group the access devices.

In an exemplary embodiment, the load balancing process 300 is configured to wait until receiving an association request from a mobile device at an access device (task 306). In accordance with one embodiment, the access device may simply route the association request to the wireless switch for further processing. In an exemplary embodiment, the load balancing process 300 is configured to determine if the access device that received the association request is the least-loaded access device (task 308). In an exemplary embodiment, the wireless switch is configured to determine if the access device is the least-loaded access device among one or more access devices grouped with the access device. The wireless switch may determine a respective load metric value based on the balancing criteria for each of the access devices in the group. The wireless switch may analyze the respective load metric value for the access device receiving the association request by comparing the respective load metric value for the access device with the respective load metric value for each access device of the group to determine if the access device is the least-loaded access device. In an exemplary embodiment, the load balancing process 300 is configured to grant the association request if the access device receiving the association request is the least-loaded access device (task 310).

For example, referring to FIG. 4, a first access device 402 and a second access device 406 may be ordered into a group at the wireless switch 104. It should be understood that in practice, there may be more than two access devices grouped together, and the exemplary case is presented with only two access devices for ease of description and is not limiting. Assuming data throughput is identified as the balancing criterion, the wireless switch 104 (e.g., data traffic monitor 204) may monitor the throughput for each access device 402, 406. In another embodiment, if the number of associated mobile devices is the balancing criterion, the wireless switch 104 may maintain information regarding number of mobile devices associated with each access device 402, 406. It should be appreciated that these are merely two exemplary balancing criteria for ease of description, and that numerous other possible criterion may be implemented in practical embodiments.

As shown, the second access device 406 may have a plurality of mobile devices 412 associated with it, while the first access device 402 does not have any associated mobile devices. In the exemplary case, if the balancing criterion is identified as the number of devices associated with an access device, when the unassociated mobile device 410 sends an association request to the first access device 402, the wireless switch 104 may identify the first access device 402 as the least-loaded access device. The wireless switch 104 may be configured to grant the association request by sending an association response indicating acceptance via the first access device 402. Similarly, if throughput were used as the balancing criterion, the first access device 402 would likely have a lower throughput than the second access device 406, and thus identified as the least-loaded access device.

Referring again to FIG. 3, in an exemplary embodiment, if the access device receiving the association request is not identified as the least-loaded access device, the load balancing process 300 may be configured to store identification information for the mobile device associated with the association request (task 312). For example, the wireless switch may be configured to maintain (e.g., in database 214) device-specific identifying information (e.g., an associated MAC address or username), along with information indicating the number of association requests received from the mobile device, and the time (e.g., timestamp) associated with each association request.

In an exemplary embodiment, the load balancing process 300 is configured to determine whether it should override the balancing criteria by comparing the identification information associated with the mobile device to an override criterion (task 314). For example, some mobile devices may continue to send association requests to the same access device, instead of attempting association with another access device on the network (e.g., no other access device in range or mobile device is malfunctioning), in which case the mobile device may require a prolonged (if not indefinite) period of time to establish a connection in the absence of an override condition. In another case, depending on the balancing criteria, two access devices may have a relatively equal average load but experience minor fluctuations during operation (e.g., throughput and/or data rate generally varies and is not static). For example, at time t1, a mobile device may attempt to associate with an access device which is not the least-loaded device. At time t2, the mobile device may then attempt to associate with a second access device, which was the least-loaded device, at time t1, but is no longer the least-loaded device. It may be possible for the least-loaded device to change at a rate, such that the mobile device would require a prolonged period of time to establish a connection. In accordance with one embodiment, the wireless switch 104 may be configured to utilize a threshold metric value to identify the least-loaded access device and/or determine whether the association request should be granted to avoid this situation (e.g., always grant the association if the access device throughput is less than a threshold value).

In these situations described above, it is often desirable to grant the association request and allow the mobile device to connect to the wireless network, in order to maintain a satisfactory experience on behalf of the user of the mobile device, even though granting the association may not satisfy the load balancing criteria. In an exemplary embodiment, the wireless switch is configured to override the balancing criteria and grant the association request if the mobile device has been attempting to establish a connection for greater than a specified period of time. In one embodiment, the specified period of time is chosen to be approximately ten seconds, which should be enough time to allow the mobile device to attempt to associate with multiple access devices without greatly impairing the user experience. In an alternative embodiment, the wireless switch may be configured to override the balancing criteria and grant the association request based on the number of failed association attempts the mobile device has made; this addresses the scenario where a persistent mobile device stubbornly attempts to associate with a particular access device even though previous association requests have been denied. However, different mobile devices may respond to a failed association attempt differently (e.g., some mobile devices attempt another association at a greater rate than others). Therefore, it is believe that using a specified period of time as the override criterion results in a more consistent behavior and a load balancing process that is more independent of the mobile device. It should be appreciated that the load balancing process 300 may be implemented without storing identification information and making an override decision (task 312, task 314), and these steps are optional features that improve or safeguard the user experience while still attempting to balance the load on the wireless network.

In an exemplary embodiment, the load balancing process 300 is configured to deny the association request if the access device associated with the association request is not the least-loaded access device (task 316). For example, referring again to FIG. 4 and the example case discussed above using the number of mobile devices as the balancing criteria, if the unassociated mobile device 410 sends an association request to the second access device 406, the wireless switch 104 may be configured to deny the association request (e.g., by sending a response indicating rejection via the second access device 406). In an exemplary embodiment, the mobile device 410 is configured to select a different access device (e.g., access device 402) and attempts to associate by sending another association request to the different access device. The loop defined by tasks 306, 308, 310, 312, 314, and 316 may repeat as needed until the mobile device 410 successfully connects to the wireless network 400 or the association procedure times out.

In alternative embodiments, the load balancing process 300 may be implemented to accommodate (or apply to) reassociation requests (e.g., when a mobile device that has already been associated with an access device is roaming throughout an area serviced by a wireless network). For example, if a mobile device roams away from a currently associated access device and finds another access device having a stronger beacon signal, the mobile device may send a reassociation request to the new access device, as will be understood. However, performing load balancing process 300 in response to reassociation requests may result in unwanted or undesirable experiences for a user of a mobile device. For example, if the mobile device is in the process of transmitting data using the associated access device and sends a reassociation request to the new access device that is subsequently denied by the wireless switch 104, the mobile device may suffer from a loss of data and/or the data communication link if the mobile device is no longer within the communication range of the associated access device. Thus, in accordance with one embodiment, reassociation requests are automatically granted to prevent any undesirable loss of data or otherwise restricting the ability to roam and/or location of a mobile device in the wireless network.

It should be appreciated that the load balancing process 300 described above may be implemented without reliance on a wireless switch by utilizing access points that have the various network intelligence and management functions incorporated therein. However, this decentralized management structure becomes more complicated to implement as the size of the wireless network and number of access points in the network increases. For example, in order to achieve the performance described above, it may require identically configuring each individual access point as opposed to merely configuring the wireless switch. Furthermore, the decentralized system may also require that each access point be compatible with a certain protocol and/or identical devices provided by the same vendor or manufacturer.

Figure 5:
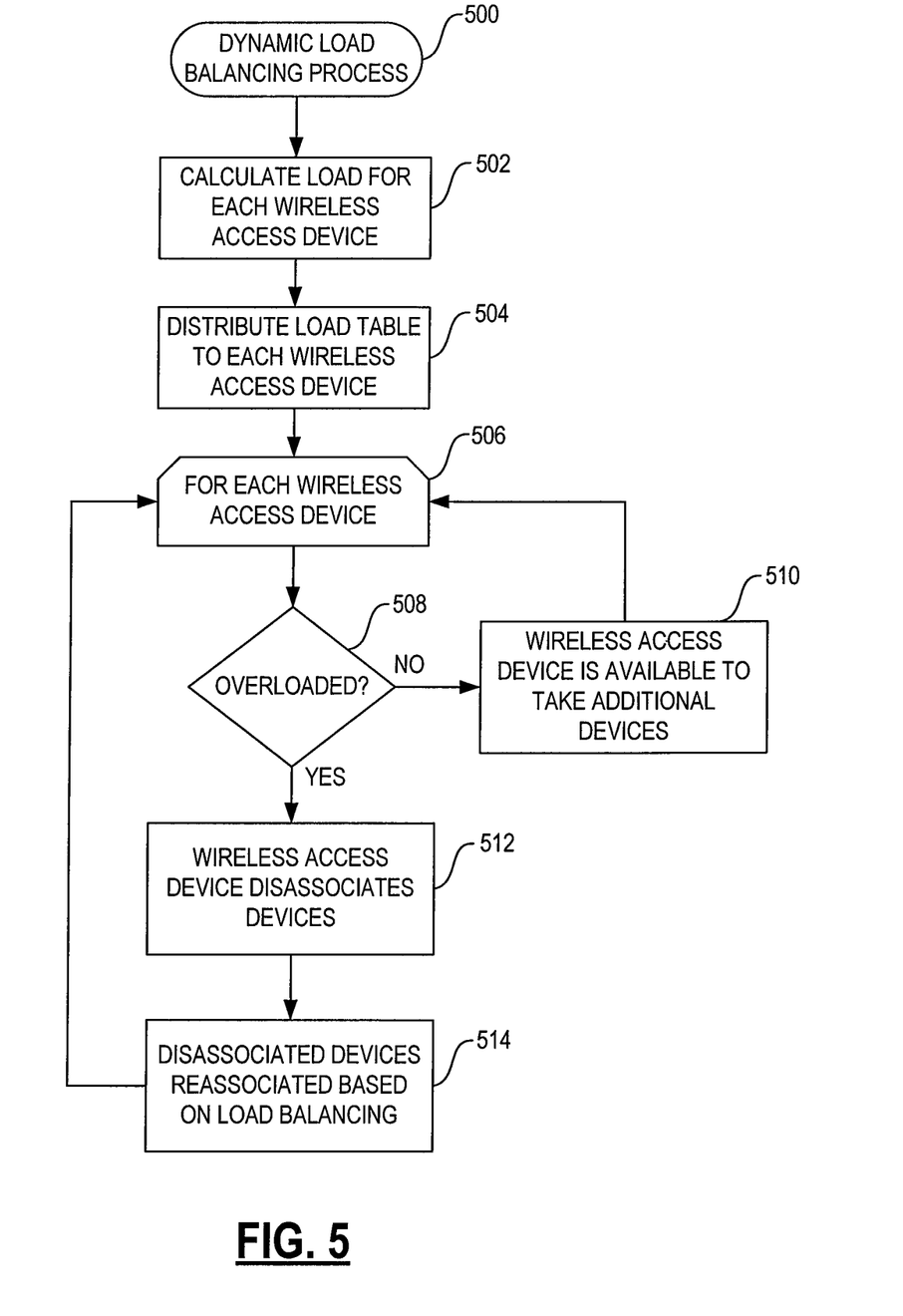
FIG. 5 is a flowchart of a dynamic load balancing process for maintaining load balance between wireless access devices in a wireless network.

Referring to FIG. 5, in an exemplary embodiment, in addition to the load balancing process 300, the wireless network 100 may be configured to perform a dynamic load balancing process 500 and additional tasks, functions, and/or operations as described below. The various tasks may be performed by software, hardware, firmware, or any combination thereof.

For illustrative purposes, the following description may refer to elements mentioned above in connection with FIG. 1 and FIG. 2. In practice, the tasks, functions, and operations may be performed by different elements of the described system, such as the wireless switch 104, 200, the processor 206, the wireless access devices 102, and/or the mobile devices 110. It should be appreciated any number of additional or alternative tasks may be included, and may be incorporated into a more comprehensive procedure or process having additional functionality not described in detail herein.

Referring now to FIG. 5, and with continued reference to FIG. 1 and FIG. 2, a dynamic load balancing process 500 may initialize anytime during wireless network operation, for example, at periodic time intervals including fixed and user-configurable periods including time ranges of approximately minutes to hours. As the dynamic load balancing process 500 is performed with in-service wireless access devices, it is both position and application aware of each of the associated mobile devices. The data traffic monitoring function is utilized to determine specific mobile devices utilizing real-time applications (e.g., voice) and the like during the dynamic load balancing process 500. Additionally, site level calibration information that includes neighborhood information for each wireless access device may also be utilized in the dynamic load balancing process 500. In operation, a goal of the dynamic load balancing process 500 is to select mobile devices for disassociation from overloaded wireless access device and to perform such selection with the least negative effect on the disassociated mobile devices. The load balancing process 300 may be used to load balance mobile devices at the time of association, the dynamic load balancing process 500 aggressively maintains the mobile devices load continuously. Since disassociating mobile devices is an aggressive technique, the dynamic load balancing process 500 is designed to operate periodically, e.g. over a user-configurable time interval, and if disassociation is required, mobile devices are carefully selected based on various criteria to minimize disruption.

The dynamic load balancing process 500 is configured to calculate a load metric for each wireless device in the wireless network (task 502). In accordance with one embodiment, load metric may be calculated in the wireless switch (e.g., in processor 206 and/or switching logic 208). The load metric is utilized to determine the load across each wireless access device. In an exemplary embodiment, the load metric for each wireless access device includes a total mobile device count and a supposed mobile device count. An average mobile device count per radio is also calculated across all wireless access devices. This average mobile device count may be utilized to determine the supposed mobile device count, e.g. the supposed mobile device count can be an idealized load given the number of mobile devices. For example, assume there are 20 mobile devices across 4 wireless access devices and assume each mobile device can associate with each wireless access device. In this scenario, a supposed mobile device count would be 5 for each wireless access device providing an idealized load. A difference between the supposed mobile device count and the actual mobile device count may be considered as a credit to take more mobile devices for a particular wireless access device. If the difference is negative, it represents a debit, meaning this wireless access device needs to dissociate some mobile devices to maintain the balance. The dynamic load balancing process 500 builds the entire list of credits for all the wireless access devices at the site and broadcasts this table to all wireless access devices (task 504).

The dynamic load balancing process 500 is now implemented on each wireless access device (task 506). When a wireless access device receives the table, it checks its credit number (task 508). If the credit is positive, the wireless access device is available to associate with additional wireless access devices, and the wireless access device does nothing but simply waits for other mobile devices to request association (task 510). If the credit number is negative, say-m, the wireless access device needs to disassociate m mobile units (task 512). The wireless access device determines which mobile devices to disassociate based on predetermined criteria, such as described in a dissociation process 600 of FIG. 6 or the like. Once each mobile device is disassociated, the mobile devices may reassociate with another wireless access device (task 514). The reassociation may be done with the load balancing process 300 or the like. Alternatively, the wireless access device that disassociated the mobile device may deny a new association request thereby ensuring load balance.

Figure 6:
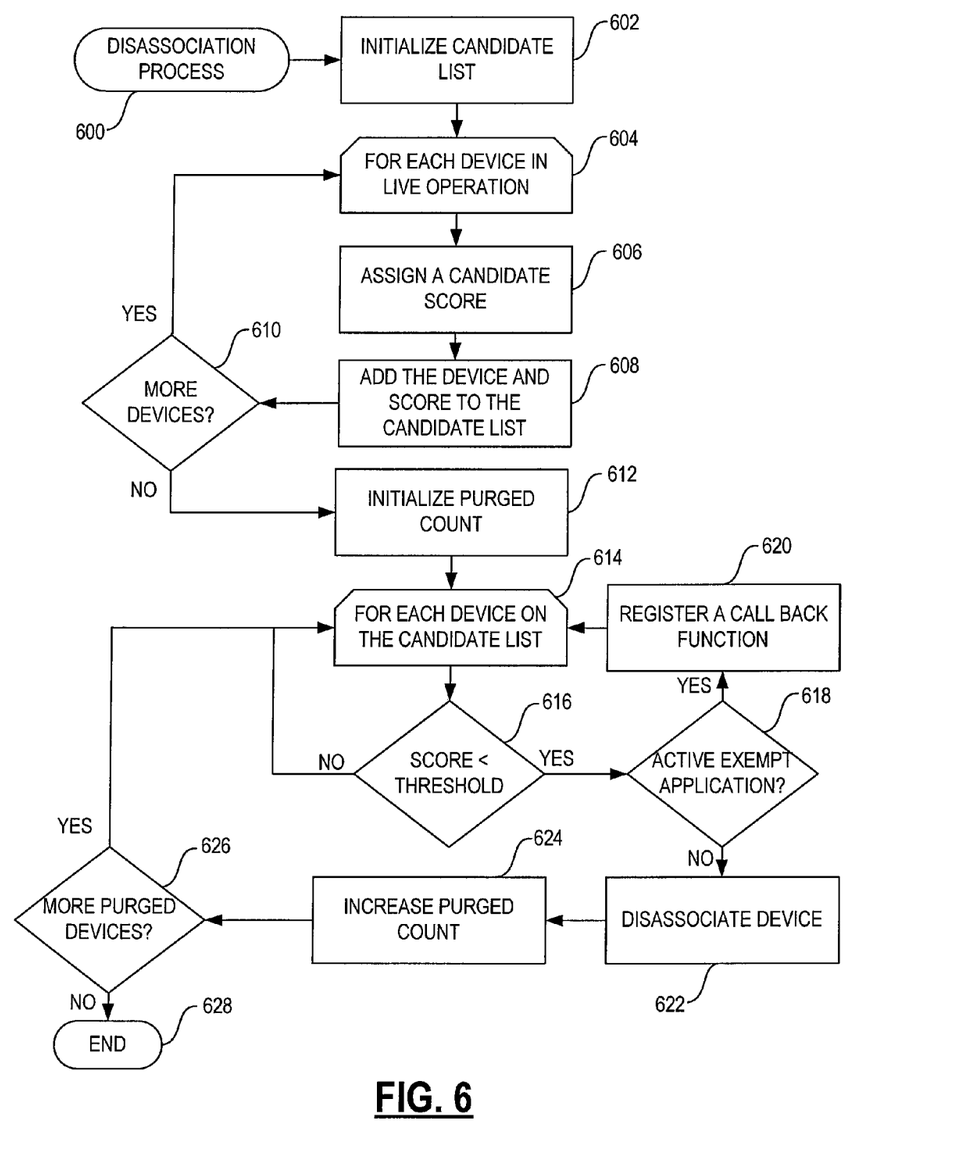
FIG. 6 is a flowchart of a disassociation process for disassociating mobile devices from a wireless access device to maintain dynamic load balancing.

Referring to FIG. 6, in an exemplary embodiment, the disassociation process 600 is illustrated for wireless access devices with a negative load credit. The disassociation process 600 is an exemplary process for determining which mobile devices to disassociate by a wireless access device to maintain dynamic load balance. Similar to the wireless switch, each wireless access device may include a processor implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The disassociation process 600 utilizes an ordered candidate list to determine which mobile units to disassociate, and the candidate list is initialized to start, i.e. emptied (task 602).

The disassociation process 600 performs operations for each mobile device in live operation (task 604). Tasks 604 through 610 may be performed sequentially, in parallel, or in combination thereof. For each mobile device, a candidate score is assigned (task 606). The candidate score is a ranking to determine whether or not a particular mobile device may be disassociated. This candidate score may be calculated in a variety of ways, such as accounting for bandwidth used by the mobile device, distance to neighboring wireless access devices with credit to accept mobile devices, utilization of critical applications that may be interrupted (e.g., voice and other real-time applications). In an exemplary embodiment, the candidate score may be calculated by mapping a mobile device's traffic load of [0, max bit rate] to a base score of [0, 256]. If there is any information about the mobile device's neighbor wireless access devices and if the neighbor has a positive credit, map the distance to that wireless access device in dB to the range [0, 256], where the 0 means closest, and possibly multiply this score by 256 and add to the base score (this may bias the score to a mobile device that is close to another wireless access device that has positive credit). The distance from a mobile device to neighboring wireless access device is reflected by the relative signal received from that wireless access device. This information can be obtained through various means including the received signal strength recorded when mobile device was associated with that wireless access device; periodic scanning by the mobile device during roaming scanning; commanded by a wireless access device (through 802.11k); and the like.

Further, if the mobile device has an exempt application in progress, then add a large number to the base score, e.g. 256*256. An exempt application may include a real-time application that cannot be interrupted through disassociation, such as, voice, video, and the like. Once a candidate score is determined for a mobile device, this is added to the candidate list (task 608). Note, the candidate list may be maintained as an ordered list based on the candidate scores, e.g. the lowest score could be in the front of the list for example. The disassociation process 600 checks to see if there are more mobile devices to calculate the candidate score for (task 610), and if so, returns to task 604.

Once the candidate list is complete, the disassociation process 600 utilizes the candidate list to determine which mobile units to disassociate to maintain load balance. As described above, the disassociation process 600 is run assuming a wireless access device has a negative credit of -m devices, i.e. m mobile devices to disassociate. In an exemplary embodiment, the wireless access device may just disassociate m mobile devices based on the candidate list, e.g. the m lowest scoring devices. In another exemplary embodiment, the disassociation process 600 may initialize a purged count, i.e. set to zero (task 612), and cycle through each mobile device in the candidate list to minimize negative effects accompanying disassociation (task 614). Here, the disassociation process 600 selects a specific mobile device from the candidate list and checks its score relative to a threshold (task 616). Note, the threshold can be any arbitrary value, and based on the exemplary process described herein, the lower the score, the more likely a mobile device is to be disassociated. For example, the threshold can be a value of 256. If the score is not less than the threshold, then the disassociation process 600 returns to task 614 to select another mobile device.

If the score is less than the threshold, the disassociation process 600 checks to see if an exempt application is active on this particular mobile device (task 618). As described herein, an exempt application is one that would be significantly disturbed through disassociation, such as an active voice call. If there is an active exempt application, a call back function is registered (task 620). This call back function marks the mobile unit as purge-pending. Also, the purge count is incremented since this mobile device will be disassociated once finished with the application. In this way, the users who have voice calls in progress are not affected. Whenever the call finishes, the corresponding mobile unit is disassociated to maintain the load. If there is no exempt application active, the disassociation process 600 disassociates the mobile unit (task 622) and increments the purged count (task 624). The disassociation process 600 continues cycling through the candidate list (task 626) until m mobile devices are disassociated (step 628). As described herein, once disassociated, a mobile device may choose to reassociate with another wireless access device, and since the disassociating wireless access device had a negative credit, it is more likely the mobile device may reassociate with another wireless access device.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for dynamic load balancing across a plurality of access devices at a site in a communication network, the method comprising the steps of:
   determining a respective load metric for each of a plurality of wireless access devices;

distributing the respective load metric to each of the plurality of wireless access devices, wherein the respective load metric includes a credit number associated with each of the plurality of wireless access devices in the site;

instructing one or more of the plurality of wireless access devices to disassociate a total number of mobile devices equal to the credit number of the respective load metric;

compiling a candidate list of mobile devices at each of the one or more plurality of wireless access devices by calculating a candidate score for each of the plurality of mobile devices based upon:
- traffic load of each of the plurality of mobile devices,
- distance to a neighboring access device with credit to accept more mobile devices, and
- utilization of exempt applications that may be interrupted by disassociation of each of the plurality of mobile devices, and adding the assigned candidate score to the candidate list in an ordered structure; and disassociating one or more of the plurality of mobile devices responsive to the candidate score.

2. The method of claim 1, wherein determining the respective load metric comprises determining a total mobile device count and a supposed mobile device count for each of the plurality of wireless access devices and an average mobile device count for the plurality of wireless access devices.

3. The method of claim 2, wherein the supposed mobile device count comprises a balanced load responsive to the average mobile device count.

4. The method of claim 1, wherein the utilization of exempt applications comprises a voice call.

5. The method of claim 1, further comprising:
checking if one of the one or more mobile devices set for disassociation is operating an exempt application;
if no exempt application is operating, disassociating the one of the one or more mobile devices; and
if an exempt application is operating, setting up the one of the one or more mobile devices to be disassociated upon completion of the exempt application.

6. The method of claim 1, further comprising:
repeating all the steps at a configurable time interval.

7. A wireless device, comprising:
a communication module, the communication module being configured to communicate with a plurality of access devices at a site in a communication on a network;
a processor coupled to the communication module; and
a database coupled to the processor, wherein the processor and the database are cooperatively configured to:
  determine a respective load metric for each of the plurality of access devices;
  distribute the respective load metric to each of the plurality of access devices, wherein the respective load metric includes a credit number associated with each of the plurality of wireless access devices in the site; and
  instruct the one or more of the plurality of access devices to disassociate a total number of mobile devices equal to the credit number of the respective load metric;
  compile a candidate list of mobile devices at each of the one or more plurality of wireless access devices by calculating a candidate score for each of the plurality of mobile devices based upon:
  - traffic load of each of the plurality of mobile devices,
  - distance to a neighboring access device with credit to accept more mobile devices, and
  - utilization of exempt applications that may be interrupted by disassociation of each of the plurality of mobile devices, and
  adding the assigned candidate score to the candidate list in an ordered structure; and
  disassociate one or more of the plurality of mobile devices responsive to the candidate score.

8. The wireless device of claim 7, further comprising:
a traffic monitor coupled to the communication module, the database, and the processor;
wherein the traffic monitor is configured to monitor traffic on the one or more mobile devices set for disassociation and to determine if an exempt application is in progress on one of the one or more mobile devices that would be disrupted by disassociation; and
wherein the processor and the database are cooperatively further configured to disassociate the one of the one or more mobile devices upon completion of the exempt application.

9. The wireless device of claim 7, wherein the processor and the database are cooperatively further configured to periodically perform dynamic load balancing across the plurality of access devices.

* * * * *